United States Patent Office 3,196,125
Patented July 20, 1965

3,196,125
HALOGENATED BUTYL RUBBER COMPOSITIONS
Roger S. Hawley, Cranford, N.J., assignor to Esso Research and Engineering Company, a corporation of Delaware
No Drawing. Filed June 6, 1961, Ser. No. 115,098
17 Claims. (Cl. 260—33.6)

The present invention relates to improved halogenated butyl rubber compositions. More specifically, it deals with forming vulcanizates, particularly of light-colored shades, having improved resistance to ozone as well as exhibiting improved adhesion to highly unsaturated rubber.

In recent years, a highly unique low unsaturation type of rubbery copolymer, denoted as halogenated butyl rubber, has been developed. Of particular interest is the chlorinated copolymer. It is particularly characterized by its low degree of unsaturation, as well as relatively small halogen content. Among the various uses suggested for halogenated butyl rubber is its application for tire sidewalls, especially premium grade white sidewalls. Additionally, it is desirable to make halogenated butyl rubber articles of white and pastel shades for insulation, plug coverings, weatherstripping, etc. It has also been used in various nonlight-colored applications such as gaskets, hose, curing bladders, tire inner liners and tire treads.

Means are constantly being sought for improving halogenated butyl rubber compositions. Particularly desired are means for improving its adhesion to relatively highly unsaturated rubbers, e.g., rubbers having a mole percent unsaturation of at least 50. In applications such as tire sidewalls and tire inner liners, adherence to the carcass structure is quite important. Additionally, difficulties have been encountered in employing halogenated butyl rubber in light-colored or pastel compositions. Such articles have tended, when exposed to natural weathering conditions, to readily acquire an unacceptable appearance due to dirt pickup.

In accordance with the present invention, means are taught whereby the adhesion of halogenated butyl rubber compositions to more highly unsaturated rubbers, as well as ozone resistance, scorching properties and weathering resistance, can be greatly improved. More specifically, it has surprisingly been found that by incorporating 1 to 30, preferably 5 to 20, parts per 100 parts of rubber (weight basis) of an oily copolymer of a major portion of a $C_4$ to $C_{10}$ conjugated diolefin such as butadiene, isoprene and piperylene, and a minor portion of a vinyl mononuclear aromatic such as styrene, $\alpha$-methyl styrene and vinyl toluene, a product of greatly improved properties is obtained. Particularly preferred are oily copolymers of butadiene and styrene.

The incorporation of minor portions of said oily copolymer greatly improves the adhesion of halogenated butyl rubbers to highly unsaturated rubbers, i.e., those having a mole percent unsaturation of over 50. Typical examples of such highly unsaturated rubbers are natural rubber, polybutadiene, polyisoprene, chloroprene and rubbery butadiene-styrene or butadiene-acrylonitrile copolymers, etc., and mixtures thereof.

The compositions of the present invention may also contain various conventional compounding agents. Various curing agents, accelerators, etc., may be employed in minor proportions based on rubber. Examples thereof are: sulfur, zinc oxide, tetramethyl thiuram disulfide, benzothiazyl disulfide, 2-mercaptoimidazoline, 2-mercapto-thiazoline, 2-mercapto-benzimidazole, zinc 2-mercapto-benzimidazolate, thiuram sulfides, and dithiocarbamates such as zinc butyl dithiocarbamate. Conventional ingredients (per 100 parts of halogenated butyl rubber) such as 0 to 5 parts of a mold release agent, e.g., stearic acid, 0 to 5 parts of a conventional bluing agent, e.g., Prussian blue, ultramarine blue, etc. may be used. The compositions may contain 10 to 200, preferably 50 to 150, parts by weight of fillers such as silica, talc, clay, as well as pigments such as titanium dioxide, lead oxide, lead carbonate, calcium carbonates, ferric hydroxide, etc. Although carbon may also be present, the compositions of the present invention will normally be free of carbon since they find particular use in pastel or white-colored articles.

The present compositions may be cured at 200° to 400° F., preferably 250° to 350° F., by any of the conventional techniques, e.g., steam curing, press curing, etc.

For the sake of clarifying the nature of the low unsaturation rubbery copolymers to which the present invention is addressed, it is noted that copolymers of the above general class, particularly where the copolymers contain about 85 to 99.5 wt. percent of a $C_4$ to $C_8$ isoolefin, e.g., isobutylene, with about 15 to 0.5 wt. percent of a multiolefin of about 4 to 14 carbon atoms, e.g., myrcene, isoprene, butadiene, etc., are well known in the literature as "butyl rubber." For example, see "Synthetic Rubber," by G. S. Whitby, and U.S. Patent 2,356,128, among many others. Halogenated butyl rubber-type copolymers are produced by halogenating butyl rubber in a manner which does not substantially degrade its molecular weight but, however, gives a rubbery product of substantially different properties than the unhalogenated material. Butyl rubber may be halogenated at temperatures of —50° to 200° C., preferably 0° to 100° C., at pressures of 0.5 to 900 p.s.i.a. with suitable halogenating agents such as gaseous chloride, liquid bromine, iodine monochloride, sulfenyl halide, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a nonsolvent at about 0° to 180° C., spray drying, or by flashing off the hydrocarbon solvent by injection into a hot water bath.

Preferably, the degree of halogenation is carefully regulated so that the halogenated copolymer contains at least 0.5 wt. percent of combined halogen but not more than about 1 atom of combined fluorine or chlorine per double bond in the polymer, nor more than 3 atoms of combined bromine or iodine per double bond. A more detailed description of the formation of chlorinated butyl rubber may be had by referring to co-assigned U.S. Patent 2,944,578.

The halogenated copolymer has a viscosity average molecular weight of about 100,000 to 2,000,000 and a mole percent unsaturation of between 0.1 to 20, preferably less than 10. As hereinafter employed in the specification, the term "halogenated butyl rubber" denotes the above-described halogenated copolymers of a major portion of a $C_4$ to $C_8$ isoolefin and a minor portion of a $C_4$ to $C_{14}$ multiolefin.

The oily polymers employed in the present invention may be those prepared by copolymerizing 95 to 50 parts by weight of butadiene-1,3 and 5 to 50 parts by weight of styrene with alkali metals, such as sodium or potassium. A particularly suitable polymer is an oily copolymer of 75 to 85% butadiene and 15 to 25% styrene. The polymerization is carried out in a reaction diluent at temperatures ranging from about 25° to 95° C., or preferably between 40° and 90° C., and is desirably continued until complete conversion of monomers is obtained. About 1.2 to 5 parts, preferably 1.5 to 4 parts, of finely-divided metallic sodium per 100 parts of monomers may be used as catalyst. Materials used as diluents in the polymerization are inert hydrocarbons which remain liquid under the reaction conditions employed. Accordingly, the diluents employed have a boiling point between about 10° and 200° C., the low boiling diluents being useful where it is permissible to keep the reaction pressure sufficiently high to maintain the diluent in liquid condition at the reaction temperature used.

Preferred diluents are essentially aliphatic hydrocarbons, such as naphtha, having a boiling range between about 90° and 120° C., or straight-run mineral spirits, such as "Varsol," having a boiling range between about 150° and 200° C., butane, benzene, cyclohexane, xylenes, toluenes, pentanes and similar inert hydrocarbons, are also useful, individually or in admixture with each other. The hydrocarbon diluents are used in amounts from 100 to 500, preferably 150 to 300, parts per 100 parts of monomer. In other words, the resulting oily compositions as synthesized normally contain about 20 to 50% of the polymer dissolved in a hydrocarbon solvent. When desired, more concentrated compositions can be produced from the synthesis product by stripping off excess solvent. For purposes of the present invention, it is desirable to concentrate nonvolatile matter to at least 90%, and preferably 100%. The presence of solvent is unnecessary and is undesirable except in small amounts.

The Staudinger molecular weight of the nonvolatile portion of the polymeric constituents of the copolymer oil usually falls between about 2,000 and 20,000, preferably 5,000 and 10,000.

It has previously been suggested to employ polybutadiene as a plasticizer for various rubbery polymers (see U.S. 2,638,460 to Crouch). However, the present invention is distinguished over this practice since it involves the use of butadiene-styrene copolymers in a specific rubbery polymer formulation, i.e., halogenated butyl rubber. The combination of these materials gives advantageous results well beyond that of mere plasticization, i.e., it results in improved ozone resistance, better scorch and weathering properties, and greater adhesion to highly unsaturated rubbers. Additionally, the present compositions are readily cured with materials such as zinc oxide and 2-mercapto-imidazoline which will not cure butyl rubber, butadiene-styrene rubber or natural rubber blended with oily butadiene-styrene polymer.

The various aspects and modifications of the present invention may be made more clearly apparent by reference to the following description and accompanying examples.

A typical halogenated butyl rubber copolymer, hereinafter termed "halogenated butyl rubber A," was prepared by halogenating a butyl rubber with chlorine at a temperature of about 25° C. The resulting halogenated copolymer was composed of about 97 wt. percent isobutylene, 1.8 wt. percent isoprene, and contained 1.2 wt. percent combined chlorine. It had a viscosity average molecular weight of about 400,000 and a mole percent unsaturation of about 1.8.

The typical oily polymer of a major portion of a $C_4$ to $C_{10}$ conjugated diolefin and a minor portion of a vinyl aromatic employed in the examples (unless otherwise indicated) was a butadiene-styrene copolymer prepared by sodium polymerization at a temperature of 50° to 80° C. in the presence of Varsol or naphtha diluent. Varsol is a mixture of straight and branched chain paraffins, naphthenes (cycloparaffins) and $C_9$ or higher aromatics boiling between 305° and 410° F.

The butadiene-styrene copolymer contained 80 wt. percent butadiene-1,3 and 20 wt. percent styrene, and had the following specification:

Color [1] _____ 1 Gardner.
Viscosity [1] _____ C to E Gardner=Holdt viscosity.
Specific gravity _____ 0.84 to 0.85 (50% solution in Varsol).
Volatiles _____ 98.5% nonvolatiles at 27 inches of Hg at 375° F. for 30 minutes.

[1] 50% solution in Varsol, in accordance with "Physical and Chemical Examination of Paints, Varnishes, Lacquers and Colors" (1950—H. A. Gardner Laboratory, Bethesda, Md.).

EXAMPLES 1 THROUGH 8

In each of several runs, halogenated butyl rubber was compounded with the various conventional compounding agents indicated in Table I. Compounds 1, 4 and 7 contained no butadiene-styrene polymer oil, whereas minor portions of polymer oil were employed in the other compounds.

The compounds were then tested for scorch prior to vulcanization, their Mooney scorch values being tabulated in Table II.

Portions of each of the compounds of Table I were cured for 25 minutes at 307° F. in the form of pads and tested for ozone resistance. The results are set forth in Table II.

*Table 1*

| Compound Number | 1 | 2 | 3 | 4 | 5 | 6 | 7 | 8 |
|---|---|---|---|---|---|---|---|---|
| Halogenated Butyl Rubber A | 100 | 95 | 85 | 100 | 95 | 85 | 100 | 85 |
| Oily Butadiene-Styrene Polymer | | 5 | 15 | | 5 | 15 | | 15 |
| MgO (Maglite K) | 2.0 | 2.0 | 2.0 | 2.0 | 2.0 | 2.0 | | |
| Hydrated Silicon Dioxide (Hi Sil 233) | | | | 20.0 | 20.0 | 20.0 | | |
| TiO$_2$ (Titanox ALO) | 40.0 | 40.0 | 40.0 | 40.0 | 40.0 | 40.0 | 70.0 | 70.0 |
| Talc (Mistron Vapor) | 105.0 | 105.0 | 105.0 | 70.8 | 70.8 | 70.8 | 80.0 | 80.0 |
| Stearic Acid | 1.0 | 1.0 | 1.0 | 1.0 | 1.0 | 1.0 | 1.0 | 1.0 |
| Stabelite Resin [1] | | | | 1.25 | 1.25 | 1.25 | | |

The above mixes were made in a Struthers Wells mixer using a quantity factor of 10. The following were added on a cool roll mill.

| | 1 | 2 | 3 | 4 | 5 | 6 | 7 | 8 |
|---|---|---|---|---|---|---|---|---|
| Glycerol | | | | 3.0 | 3.0 | 3.0 | | |
| N-lauroyl-p-aminophenol (Suconox 12) | | | | 1.0 | 1.0 | 1.0 | | |
| Ultramarine Blue | 0.20 | 0.20 | 0.20 | 0.20 | 0.20 | 0.20 | 0.20 | 0.20 |
| ZnO | 5.0 | 5.0 | 5.0 | 5.0 | 5.0 | 5.0 | 5.0 | 5.0 |
| 2-mercapto-imidazoline (NA-22) | 4.0 | 4.0 | 4.0 | 4.0 | 4.0 | 4.0 | | |
| Sulfur | | | | | | | 2.30 | 2.30 |
| Tetramethyl Thiuram Disulfide | | | | | | | 0.40 | 0.40 |
| Benzothiazyl Disulfide | | | | | | | 1.25 | 1.25 |

[1] Hydrogenated rosin.

Table II

| Compound Number | 1 (Control) | 2 | 3 | 4 (Control) | 5 | 6 | 7 (Control) | 8 |
|---|---|---|---|---|---|---|---|---|
| Mooney Scorch at 260° F. (using small rotor): | | | | | | | | |
| Minimum Reading | 30 | 25 | 3 | 23 | 20 | 7 | 28 | 10 |
| Time for 5 Point Rise, Min | 16 | | 30+ | 22.5 | 25.5 | 30+ | 15 | 30+ |
| Time for 10 Point Rise, Min | 21 | 22.5 | 30+ | 28 | 30+ | 30+ | 18 | 30+ |
| Ozone Resistance (at 50% Extension in 0.2 vol. percent ozone) 25 Min. Cure at 307° F. (6″ x 6″ x 0.075″ Pads): | | | | | | | | |
| Average Time to Crack, Min | 35 | 35 | 129 | 75 | 114 | 154 | 18 | 31 |
| Average Time to Break, Min | 125 | 176 | 347 | 164 | 230 | 410+ | 34 | 115 |

As is illustrated in Table II, halogenated butyl rubber vulcanizates containing minor portions of oily butadiene-styrene copolymers show greatly improved resistance to ozone attack as compared with conventional halogenated butyl rubber compositions (Compounds 1, 4 and 7). Further, the compositions of the present invention have improved scorching properties as compared with halogenated butyl rubber not containing oily copolymers of $C_4$ to $C_{10}$ conjugated diolefins and vinyl aromatics.

The carcass compound and each of the halogenated butyl compounds of Table I were put in a sandwich in an unvulcanized state and then cured. The adhesion of each of the halogenated butyl-unsaturated rubber covulcanizates was then tested in duplicate tests denoted A and B in accordance with ASTM procedure D–413–39 (Machine Method). Results are summarized in Table III.

Table III

| Compound Number | 1 (Control) | 2 | 3 | 4 (Control) | 5 | 6 | 7 (Control) | 8 |
|---|---|---|---|---|---|---|---|---|
| A—ADHESION AT ROOM TEMPERATURE TO NR-SBR CARCASS (ASTM PROCEDURE D–413–39) 29 Minute Cures at 307° F. Adhesion Pull (lb./in. at 2 in./min. pull): | | | | | | | | |
| Sandwich A | [2]12 | [2]18 | [1]23 | [2]12 | [2]18 | [2]27 | [2]15 | [1]20 |
| Sandwich B | [2]10 | [2]18 | [1]28 | [2]10 | [2]15 | [2]30 | | |
| B—ADHESION AT 212° F. TO NR-SBR CARCASS 29 Minute Cures at 307° F. Adhesion Pull (lb./in. at 2 in./min. pull): | | | | | | | | |
| Sandwich A | [2]3 | [2]4 | [1]17 | [2]5 | [2]8 | [2]17 | [2]5 | [1]13 |
| Sandwich B | [2]3 | [2]4 | [1]17 | [2]6 | [2]7 | [2]17 | [2]5 | [1]16 |

[1] Sandwich failure in white vulcanizate, indicating that the adhesion bond is stronger than the white vulcanizate.
[2] Sandwich failure in white vulcanizate at the interface, indicating that the white surface strength is less than that of the adhesion bond.

EXAMPLES 9 THROUGH 16

In order to demonstrate the high adhesion of the compositions of the present invention to highly unsaturated rubbers, the following experimental tests are described.

Halogenated butyl rubber A was compounded in the manner indicated previously in Table I. Each of the compounds was then covulcanized with a commercial natural rubber, butadiene-styrene tire carcass compound for 29 minutes at 307° F. The carcass compound was that described in "The Vanderbilt News," vol. 22, No. 4 (October 1956), page 46, except Necton–60 was substituted for pine tar. The carcass compound was composed of:

| | Parts by weight |
|---|---|
| Smoked sheet | 50 |
| SBR 1000 | 50 |
| Reogen [1] | 2 |
| Stearic acid | 2 |
| Zinc oxide | 3 |
| Heptylated diphenyl amine (Age Rite Stalite) | 1.5 |
| Necton–60 [2] | 3 |
| FEF black | 10 |
| SRF black | 40 |
| Sulfur | 2.5 |
| Benzothiazyl disulfide | 1.25 |
| Tetramethyl thiuram disulfide | 0.20 |

[1] Mixture of oil soluble sulfonic acid and paraffin oil.
[2] Plasticizer oil boiling in the range of about 750° to 950° F., specific gravity of 0.89, and containing 23% aromatics.

As is seen from Table III, the compositions of the present invention, i.e., Compounds 2, 3, 5, 6 and 8, gave considerably stronger adhesion to a highly unsaturated rubber than did halogenated butyl rubber cured in the absence of oily butadiene-styrene polymer. Adhesion improvements as much as fivefold were obtained (compare Compounds 1 and 3 in the test at 212° F.).

In summary, the compositions of the present invention show improved properties both as to scorch and ozone resistance. They may be readily bonded to high unsaturation rubbers and from bonds of a greatly increased adhesive strength therewith.

Numerous modifications will suggest themselves to one skilled in the art. For example, the substitution of other fillers for those used, variation of the total filler loading, as well as ratios of the fillers, are all within the scope of the present invention.

Having described the present invention, that which is sought to be protected is set forth in the following claims.

What is claimed is:

1. A composition of improved properties which comprises a halogenated rubbery copolymer of 85 to 99.5 wt. percent of a $C_4$ to $C_8$ isoolefin and 0.5 to 15 wt. percent of a $C_4$ to $C_{14}$ multiolefin, and 1 to 30 parts per 100 parts of rubbery copolymer of an oily copolymer of a major portion of a $C_4$ to $C_{10}$ conjugated diolefin and a minor portion of a vinyl mono-nuclear aromatic, said oily copolymer having a Staudinger molecular weight of between about 2,000 and 20,000.

2. The composition of claim 1 wherein said oily polymer is a copolymer of 50 to 95 parts by weight of butadiene-1,3 and 5 to 50 parts by weight of styrene.

3. The composition of claim 1 wherein said oil polymer is a copolymer of 75 to 85 wt. percent butadiene and 15 to 25 wt. percent styrene.

4. A light-colored vulcanizate comprising a halogenated rubbery copolymer of 85 to 99.5 wt. percent of a $C_4$ to $C_8$ isoolefin and 0.5 to 15 wt. percent of a $C_4$ to $C_{14}$ multiolefin, and 1 to 30 wt. percent, based on rubbery copolymer, of an oily copolymer of 50 to 95 parts by weight of butadiene and 5 to 50 parts by weight of styrene, said oily copolymer having a Staudinger molecular weight of between about 2,000 and 20,000.

5. The composition of claim 4 wherein said halogenated rubbery copolymer contains at least 0.5 wt. percent based on the copolymer but not more than about 1 atom of chlorine per double bond and not more than 3 atoms of bromine per double bond.

6. A composition of improved properties which comprises a chlorinated rubbery copolymer of 85 to 99.5 wt. percent of a $C_4$ to $C_8$ isoolefin and 0.5 to 15 wt. percent of a $C_4$ to $C_{14}$ multiolefin, and 1 to 30 parts per 100 parts of rubber of an oily polymer of a major portion of a $C_4$ to $C_{10}$ conjugated diolefin and a minor portion of a vinyl mono-nuclear aromatic, said oily copolymer having a Staudinger molecular weight of between about 2,000 and 20,000.

7. A composition of improved properties which comprises a chlorinated rubbery copolymer of 85 to 99.5 wt. percent of a $C_4$ to $C_8$ isoolefin and 0.5 to 15 wt. percent of a $C_4$ to $C_{14}$ multiolefin, and 1 to 30 parts per 100 parts of chlorinated rubbery copolymer of an oily copolymer of 95 to 50 parts by weight of butadiene and 5 to 50 parts by weight of styrene, said oily copolymer having a Staudinger molecular weight of between about 2,000 and 20,000.

8. A composition according to claim 7 wherein said rubbery polymer contains at least 0.5 wt. percent combined chlorine but not more than 1 atom of chlorine per double bond in the copolymer.

9. A composition according to claim 7 wherein 5 to 20 parts per 100 parts of chlorinated rubbery copolymer of said oily copolymer is present.

10. A composition according to claim 7 wherein said oily polymer is a copolymer of 75 to 85 wt. percent butadiene and 15 to 25 wt. percent styrene.

11. An improved composition which comprises: a chlorinated rubbery copolymer of 85 to 99.5 wt. percent of a $C_4$ to $C_8$ isoolefin and 0.5 to 15 wt. percent of a $C_4$ to $C_{14}$ multiolefin, and admixed therewith 1 to 30 parts per 100 parts of chlorinated rubbery copolymer of an oily polymer of 50 to 95 parts by weight of butadiene and 5 to 50 parts by weight of styrene, said oily copolymer having a Staudinger molecular weight of between about 2,000 and 20,000; and an unsaturated rubber having a mole percent unsaturation of over 50, said rubbers having been covulcanized while in contact with one another.

12. A light-colored white tire sidewall having the composition of claim 11.

13. A process for improving the properties of a halogenated rubbery copolymer of 85 to 99.5 wt. percent of a $C_4$ to $C_8$ isoolefin and 0.5 to 15 wt. percent of a $C_4$ to $C_{14}$ multiolefin which comprises admixing said copolymer with 1 to 30 parts per 100 parts of rubbery polymer of an oily copolymer of 50 to 95 parts by weight of butadiene and 5 to 50 parts by weight of styrene, and curing the admixture at a temperature of 200° to 400° F. in the presence of curatives.

14. The process of claim 13 wherein said halogenated rubbery copolymer is a chlorinated rubbery copolymer and wherein 5 to 20 parts of said oily copolymer per 100 parts of chlorinated rubbery copolymer is employed.

15. A process for improving the adhesion of a halogenated rubbery copolymer of 85 to 99.5 wt. percent of a $C_4$ to $C_8$ isoolefin and 0.5 to 15 wt. percent of a $C_4$ to $C_{14}$ multiolefin to an unsaturated rubber having a mole percent unsaturation above 50 which comprises, admixing with said copolymer an oily polymer in a concentration of 1 to 30 parts per 100 parts of halogenated rubbery copolymer, said oily polymer being a copolymer of 50 to 95 parts by weight of butadiene and 5 to 50 parts by weight of styrene, and thereafter covulcanizing said halogenated rubbery copolymer and unsaturated rubber while said rubbers are in contact with one another.

16. The process of claim 15 wherein said unsaturated rubber is selected from the group consisting of natural rubber, polybutadiene, polyisoprene, chloroprene, rubbery butadienestyrene, butadiene-acrylonitrile copolymers and mixtures thereof.

17. The process of claim 15 wherein said halogenated rubbery copolymer contains at least 0.5 wt. percent based on the copolymer, but not more than about 1 atom of chlorine per double bond.

References Cited by the Examiner

UNITED STATES PATENTS

| | | | |
|---|---|---|---|
| 2,631,175 | 3/53 | Crouch | 260—33.6 |
| 2,638,460 | 5/53 | Crouch | 260—33.6 |
| 2,933,117 | 4/60 | Baldwin et al. | 260—45.5 |
| 2,944,578 | 7/60 | Baldwin et al. | 260—45.5 |

MORRIS LIEBMAN, *Primary Examiner.*

DANIEL ARNOLD, ALEXANDER H. BRODMERKEL,
*Examiners.*